United States Patent
Krishna et al.

(10) Patent No.: US 10,936,570 B2
(45) Date of Patent: Mar. 2, 2021

(54) ONLINE AND DYNAMIC TABLE RECONFIGURATION

(71) Applicant: Teradata US, Inc., Dayton, OH (US)

(72) Inventors: Tirunagari Venkata Rama Krishna, Telangana (IN); Srinath Boppudi, Telangana (IN); Frederick Stuart Kaufmann, Irvine, CA (US)

(73) Assignee: Teradata US, Inc., San Diego, CA (US)

( * ) Notice: Subject to any disclaimer, the term of this patent is extended or adjusted under 35 U.S.C. 154(b) by 455 days.

(21) Appl. No.: 15/852,624

(22) Filed: Dec. 22, 2017

(65) Prior Publication Data

US 2019/0197143 A1   Jun. 27, 2019

(51) Int. Cl.
| G06F 16/30 | (2019.01) |
| G06F 16/22 | (2019.01) |
| G06F 16/28 | (2019.01) |
| G06F 16/23 | (2019.01) |

(52) U.S. Cl.
CPC ...... *G06F 16/2282* (2019.01); *G06F 16/2255* (2019.01); *G06F 16/2343* (2019.01); *G06F 16/2372* (2019.01); *G06F 16/2379* (2019.01); *G06F 16/283* (2019.01)

(58) Field of Classification Search
CPC .......................... G06F 16/2343; G06F 16/2379
See application file for complete search history.

(56) References Cited

U.S. PATENT DOCUMENTS

| 5,625,815 | A | * | 4/1997 | Maier ................... G06F 16/284 |
| 5,857,088 | A | | 1/1999 | Keith et al. |
| 6,829,694 | B2 | | 12/2004 | Stein |
| 6,965,899 | B1 | * | 11/2005 | Subramaniam ..... G06F 16/2282 |
| 9,436,472 | B2 | | 9/2016 | Brevets et al. |
| 9,558,216 | B2 | * | 1/2017 | Florendo ............. G06F 16/9024 |
| 9,710,511 | B2 | | 7/2017 | Wright et al. |
| 2001/0047360 | A1 | * | 11/2001 | Huras ................. G06F 16/2379 |
| 2005/0012092 | A1 | | 1/2005 | Lee et al. |
| 2009/0319581 | A1 | * | 12/2009 | Seifert .................... G06F 16/22 |
| 2012/0089566 | A1 | * | 4/2012 | Effern ................. G06F 16/2379 |
| | | | | 707/611 |
| 2017/0116241 | A1 | * | 4/2017 | Kumar .................. G06F 16/278 |

OTHER PUBLICATIONS

Manual entitled "SQL Data Definition Language Syntax and Examples Release 16.10", by Teradata, dated Jun. 2017.*
Article entitled "Oracle 12c Database: Online Table Redefinition and Datafile Movement", by Ameen, dated Mar. 9, 2014.*

(Continued)

*Primary Examiner* — Mahesh H Dwivedi
(74) *Attorney, Agent, or Firm* — Schwegman, Lundberg & Woessner, P.A.; Howard Speight

(57) ABSTRACT

A table reconfiguration command is received. A READ lock is placed on the table while original table data for the table is moved from a first network location to a second network location into a temporary table according to a new map for the table. An EXCLUSIVE lock on the table is obtained, a data dictionary is modified with the new map for the table, the original table data at the first network location is deleted, and the temporary table is renamed to be the table at the second network location; then, the EXCLUSIVE lock is released.

18 Claims, 4 Drawing Sheets

(56) References Cited

OTHER PUBLICATIONS

Article entitled "Move Table Online—12cR2", by Srivastava, dated Aug. 23, 2017.*
Article entitled "Using DB2's Admin_Move_Table to Move Tables from One Tablespace to Another", by Cooks, dated Mar. 8, 2016.*
Article entitled "Moving tables online using Admin_Move_Table", by Babani, dated Apr. 2, 2010.*

* cited by examiner

ONLINE AND DYNAMIC TABLE RECONFIGURATION

BACKGROUND

When database processing engines in a distributed database are added or removed, the tables or portions of the tables of the database being handled by each the remaining database processing engines have to be reconfigured. That is, each engine is assigned particular tables, or portions of tables, for processing, such that the tables, or portions of the tables, have to be relocated to the network node where the engines are processing for proper reconfiguration.

Currently, table movement/reconfiguration is handled by an offline process that requires the tables to be inaccessible and offline for the reconfiguration.

One technique to address this situation, is to do the movement/reconfiguration over an extended period of time, such that sets of tables are moved in a batch late at night or when there is believed to be little to no database activity. However with this technique, once the table reconfiguration is initiated the process cannot be aborted, which means the technique is not an ideal solution.

Consequently, there is a need for moving tables between distributed nodes and reconfiguring database engines while the tables, the engines, and the database remain online.

SUMMARY

Methods and a system for online and dynamic table reconfiguration are presented.

In an embodiment, a method for online and dynamic table reconfiguration is provided. A new map is created representing moving a table (or a portion(s) of a table) from a first network location to a second network location. A READ lock is obtained on a table. The original table data for the table is moved from the first network location into a temporary table at the second network location using the new map. An EXCLUSIVE lock is acquired on the table. A data dictionary is updated with the new map, the original table data is deleted from the first network location, the temporary table is renamed to be the table, and the EXCLUSIVE lock is released.

DETAILED DESCRIPTION

Various embodiments depicted herein are implemented as one or more software modules, which are programmed within memory and/or non-transitory computer-readable storage media and executed on one or more processing devices (having memory, storage, network connections, one or more processors, etc.).

As used herein, the terms and phrases "database," and "data warehouse" may be used interchangeably and synonymously. That is, a data warehouse may be viewed as a collection of databases or a collection of data from diverse and different data sources that provides a centralized access and federated view of the data from the different data sources through the data warehouse (may be referred to as just "warehouse").

As used herein a "processing unit" is a distributed database engine that executes instructions on a network node device of the processing unit. Multiple distributed processing units are provided for executing database instructions in parallel over a network. The phrase "processing unit" may be used interchangeable and synonymously with the phrase "Access Module Processor (AMP)."

As used herein, the term "table" or "tables" may be used interchangeably and synonymously with "a portion of a table" or "portions of a table;" that is, a table or just a portion of a table is intended to mean the same thing herein and below.

A novel and table moving or table reconfiguration technique is provided herein to provide table movement/reconfiguration of a data warehouse while the tables, the AMPs, and the data warehouse remains online and accessible to users. This has heretofore not been capable in the industry where any table movement due to added AMPs or removed AMPs required an offline administrative reconfiguration operation.

The processing discussed herein introduces a new and enhanced Data Manipulation Language (DML) operation referenced in a data warehouse's Application Programming Interface (API) and interfaces by the phrase "ALTER TABLE MAP." In an embodiment, the DML is Structured Query Language (SQL). The new operation takes as a parameter an identifier for a table or a list of table identifiers.

Figure 1:
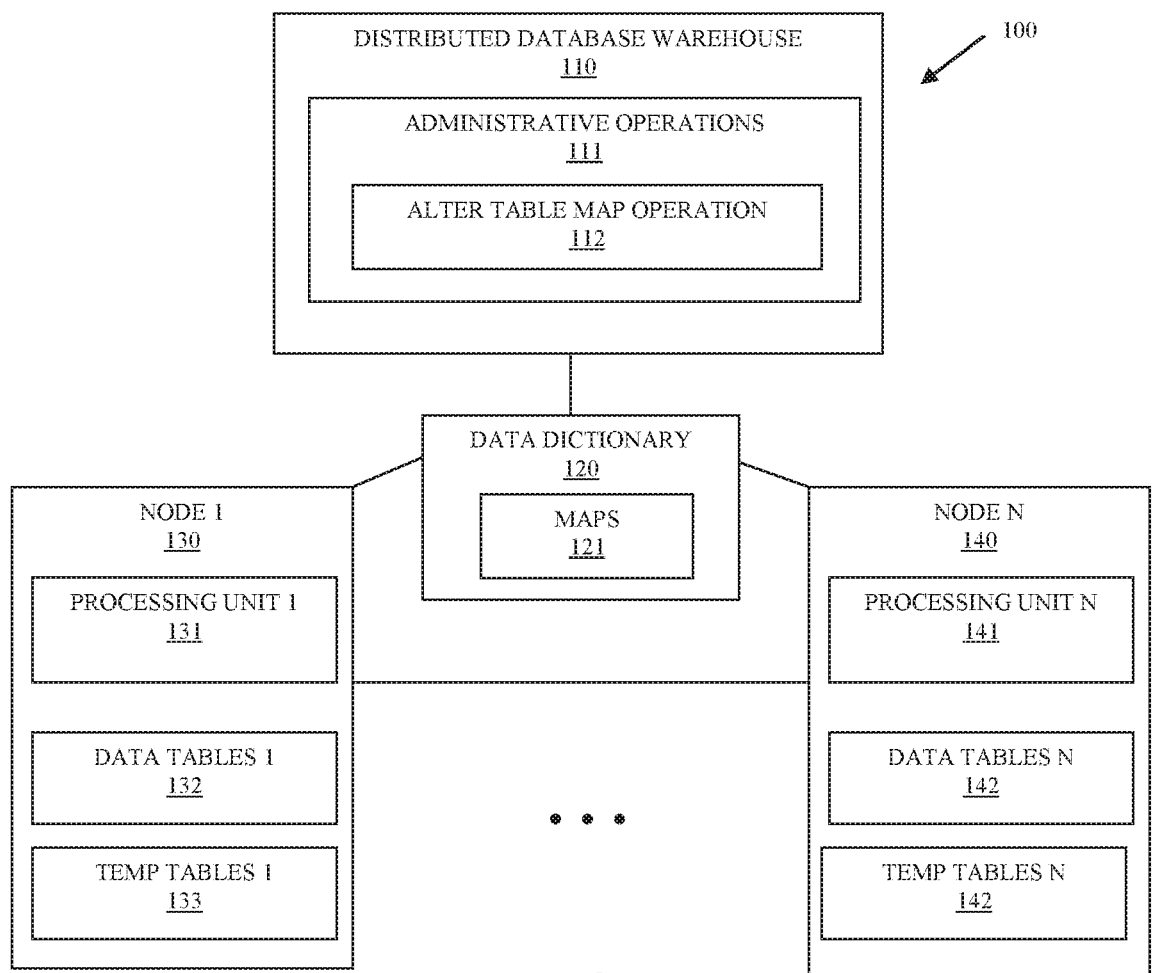
FIG. 1 is a diagram of a system for online and dynamic table reconfiguration, according to an embodiment.

FIG. 1 is a diagram of a system 100 for online and dynamic table reconfiguration, according to an embodiment.

The system 100 is shown in greatly simplified form with just those components necessary for comprehension of embodiments of the invention presented. It is to be understood that additional components or subcomponents may be used without departing from the teachings presented herein.

The system 100 includes a distributed data warehouse 110 having administrative operations 111. The administrative operations 111 include the new and novel alter table map operation 112. The warehouse 110 also includes a data dictionary 120 having a plurality of maps 121. The system 100 also includes a plurality of distributed network node devices (hardware devices with processing capabilities), represented in the FIG. 1 as node 1 130 through node N 140. The warehouse 110 further includes processing units (AMPs) 131 and 141. Each node 130 and 140 include database tables 132 and 142 and temporary tables 133 and 143.

The dictionary 120 provides a hash mapping for assignments of the tables 132 and 142 to the AMPs 131 and 141. It is to be noted that the dictionary 120 can include a variety of other metadata processed by the warehouse 110.

When an AMP (131 or 141) is removed or is being added to the warehouse 110, the assignments and locations of the tables (132 and 142) have to be reconfigured/moved and balanced for handling query processing within the warehouse 110. This also means the maps 121 have to be updated in the data dictionary 120. This would conventionally entail executing an offline administrative operation for reconfiguration/table movement and assignment. This conventional operation moves tables to the assigned AMPs on those AMPs nodes, while the operation is running, the tables are unavailable (even for read operations) within the warehouse.

The conventional processing for table movement/reconfiguration is enhanced by the processing of the new and novel alter table map operation 112.

When a database administrator (DBA), is adding an AMP (131 or 141), deleting an AMP (131 or 141), or changing table assignments for the AMPs (131 and 141), a new mapping (a new map) for the table is created that changes assignments for the table (or portions of the table), then, the DBA initiates from an administrative interface the alter table map operation 112 with a table identifier a table (132 or 142) that is being moved or reconfigured and an identifier for the new map.

The alter table map operation 112 initiates a READ lock on the table (132 and/or 142) with the new map; rather than taking an EXCLUSIVE lock (which is conventionally the case). Once the warehouse 110 confirms the READ lock is in place, the corresponding table data associated with the READ lock is copied according to the new map into sub-tables (temp tables 133 or 143). This allows workloads (queries, reports, etc.) to continue to have read access to the table (132 or 142) being moved while the alter table map operation 112 is moving the table (132 or 142) into the temp table (133 or 143) using the new map. That is, there is no down time for access to the tables 132 and/or 142. The alter table map operation 112 includes two parameters for operation: a table identifier for the table and a map identifier for the new mapping (new map).

Additionally, the alter table map operation 112 permits the table reconfiguration/movement to be rolled back at any point in time. The roll back is very quick irrespective of the size of the table (132 or 142) because all that needs to be done in the roll back is to delete the sub-tables (temp tables (133 or 143).

Once all the data is copied using the new map, the lock is then upgraded from a READ lock to an EXCLUSIVE lock. At this point, the dictionary 120 is updated to indicate that the moved table (132 or 142) is located at the new map locations within the maps 121. The transaction is committed by removing the old map from maps 121 for the moved table (132 or 142) and switching the temp table (133 or 143) holding the actual table data to be part of the corresponding data table (132 or 142)—no longer temporary. Once the EXCLUSIVE lock is taken, the processing described above is very fast and efficient since all that is being done is changing pointers in the maps 121 and renaming the temp table (133 or 143), such that the table (132 or 142) is inaccessible for a negligible amount of time. The commit processes quickly and the EXCLUSIVE lock removed nearly immediately.

In an embodiment, the alter table map operation 112 is processed as a background process that iterates on a plurality of tables being moved/reconfigured within the data warehouse 110.

These and other embodiments are now discussed with reference to the FIGS. 2-4.

Figure 2:
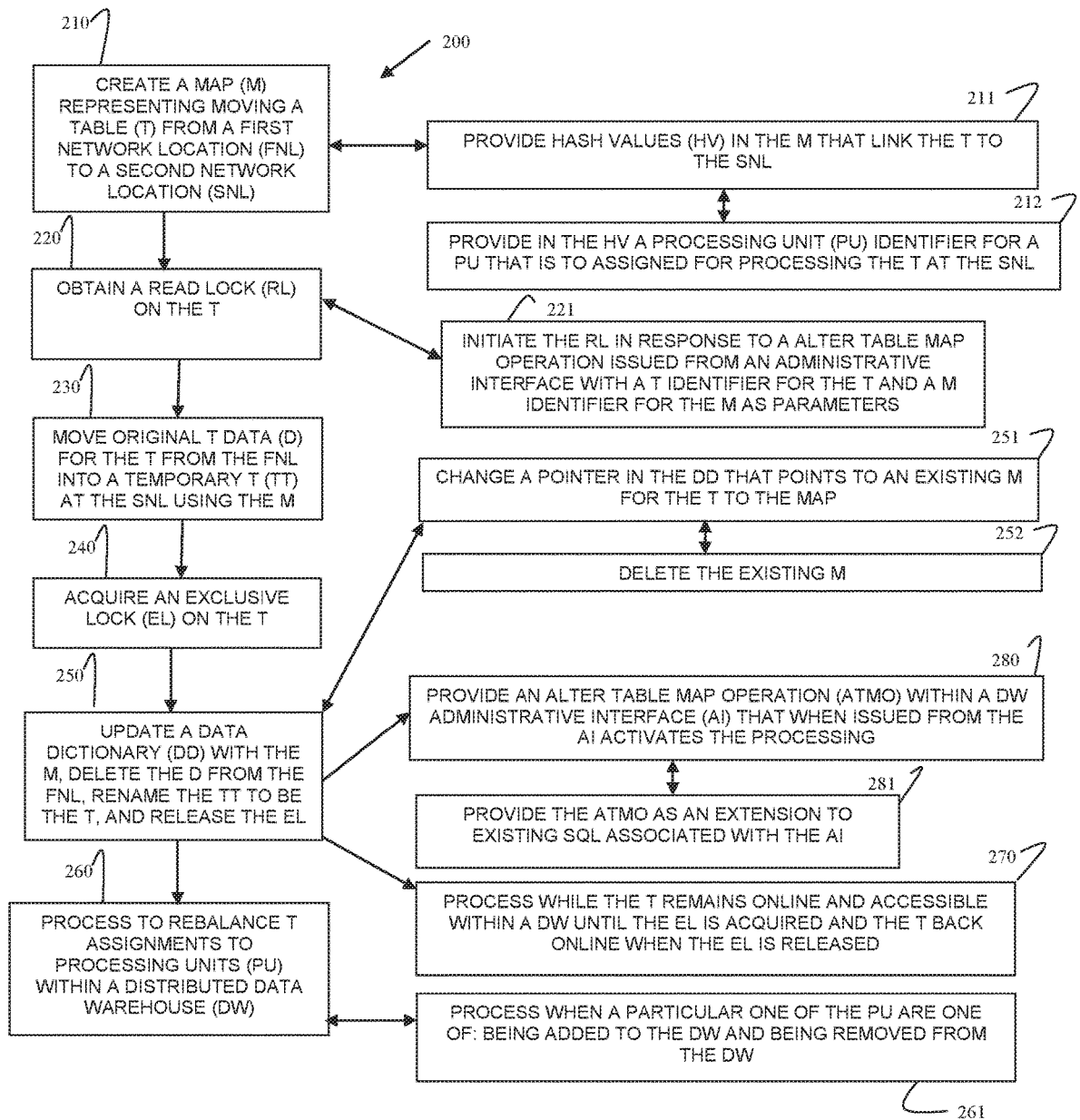
FIG. 2 is a diagram of a method for online and dynamic table reconfiguration, according to an example embodiment.

FIG. 2 is a diagram of a method 200 for online and dynamic table reconfiguration, according to an example embodiment. The method 200 is implemented as one or more software modules referred to as a "table reconfiguration manager"). The table reconfiguration manager is executable instructions that are programmed within memory or a non-transitory computer-readable medium and executed by one or more hardware processors. The table reconfiguration manager has access to one or more network connections during processing, which can be wired, wireless, or a combination of wired and wireless.

In an embodiment, the table reconfiguration manager is implemented within a data warehouse across one or more physical devices or nodes (computing devices) for execution over a network connection.

In an embodiment, the table reconfiguration manager is the alter table map operation 112.

In an embodiment, the table reconfiguration manager, inter alia, the processing discussed above with the FIG. 1.

At 210, the table reconfiguration manager creates a map representing moving a table (or portion(s) of the table) from a first network location to a second network location within the database processing environment.

In an embodiment, at 211, the table reconfiguration manager provides hash values in the map that link the table to the second network location.

In an embodiment of 211 and at 212, the table reconfiguration manager provides in the hash values a processing unit identifier for a processing unit that is to be assigned for processing the table at the second network location within the database processing environment.

At 220, the table reconfiguration manager obtains a READ lock on a table within a database processing environment of a data warehouse.

According to an embodiment, at 221, the table reconfiguration manager initiates the READ lock in response to an ALTER TABLE MAP operation issued from an administrative interface with a table identifier for the table and a map identifier for the map as a parameters to the ALTER TABLE map operation.

At 230, the table reconfiguration manager moves original table data for the table from the first network location into a temporary table at the second network location using the map. It is to be noted that this moving is actually a copy as the original table data for the table remains accessible within the database processing environment while this copying of the original table data is processed to the temporary table at the second network location.

At 240, the table reconfiguration manager acquires an EXCLUSIVE lock on the table within the database processing environment. Up until this point in time, it is to be noted, that access to the table within the database processing environment was permitted. It is also to be noted that the processing time during which the EXCLUSIVE lock remains on the table is negligible from a user's standpoint.

At 250, the table reconfiguration manager updates a data dictionary table with the map, deletes the original table data from the first network location, renames the temporary table to be the table, and releases the EXCLUSIVE lock at which point the table is online and accessible within the database processing environment from the second network location.

In an embodiment, at 251, the table reconfiguration manager changes a pointer in the data dictionary table that points to an existing map for the table to now point to the map.

In an embodiment of 251 and at 252, the table reconfiguration manager deletes the existing map.

According to an embodiment, at 260, the table reconfiguration manager is processed for rebalancing table assignments to processing units within the distributed data warehouse and database processing environment.

In an embodiment, at 261, the table reconfiguration manager is processed when a particular one of the processing units are being added to the distributed data warehouse or being removed from the distributed data warehouse.

In an embodiment, at 270, the table reconfiguration manager processes while the table remains online and accessible within the distributed data warehouse and database processing environment until the EXCLUSIVE lock is acquired, at 240, and the table is back online and accessible when the EXCLUSIVE lock is released at 250.

In an embodiment, at 280, the table reconfiguration manager provides an ALTER TABLE MAP operation which a data warehouse administrative interface that when issued from the administrative interface activates the table reconfiguration manager at 210.

In an embodiment of 280 and at 281, the table reconfiguration manager provides the ALTER TABLE MAP operation as an extension to existing SQL syntax that is associated with the administrative interface.

Figure 3:
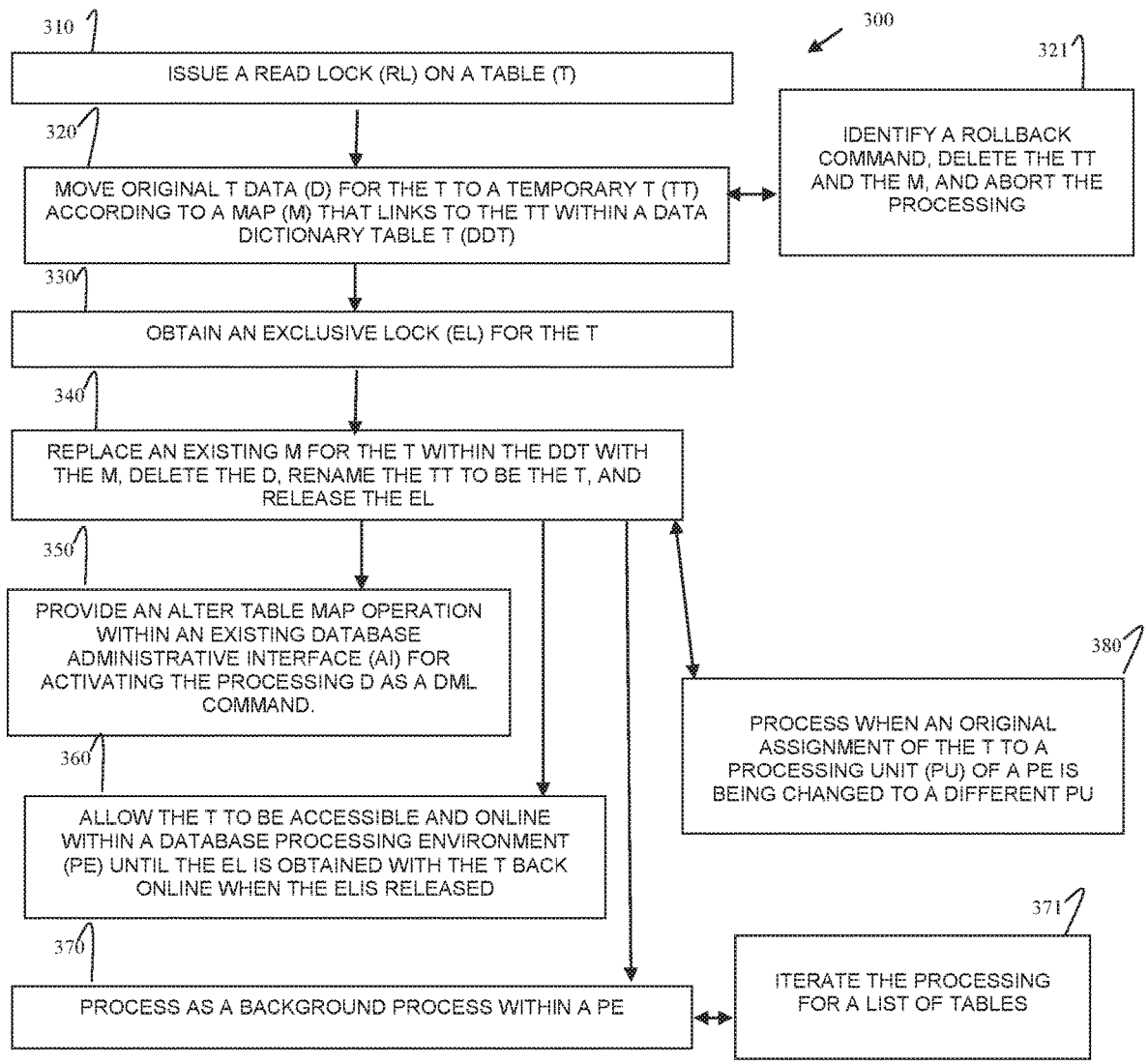
FIG. 3 is a diagram of another method for online and dynamic table reconfiguration, according to an example embodiment.

FIG. 3 is a diagram of another method 300 for online and dynamic table reconfiguration, according to an example embodiment. The method 300 is implemented as one or more software modules referred to as a "reconfiguration manager." The reconfiguration manager is executable instructions that are programmed within memory or a non-transitory computer-readable medium and executed by one or more hardware processors. The reconfiguration manager has access to one or more network connections during processing, which can be wired, wireless, or a combination of wired and wireless.

The reconfiguration manager presents another and in some ways enhanced perspective of the processing discussed above with the FIGS. 1 and 2.

In an embodiment, the reconfiguration manager is all or some combination of: the alter table map operation 112 and/or the method 200.

At 310, the reconfiguration manager issues a READ lock on a table within a database processing environment of a distributed data warehouse.

At 320, the reconfiguration manager moves (that is copies) original table data for the table to one or more temporary tables according to a mapping in a map that corresponds and links to a network location of the temporary table within a data dictionary table.

In an embodiment, at 321, the reconfiguration manager identifies a rollback command and responsive to the rollback command, the reconfiguration manager deletes the temporary table and the map. The reconfiguration manager, then, aborts the processing of 330-340.

At 330, the reconfiguration manager obtains an EXCLUSIVE lock for the table within the database processing environment. It is to be noted that the processing at 330-340 is very quickly performed and as such the table remains inaccessible for a negligible period of time within the database processing environment.

At 340, the reconfiguration manager replaces an existing map for the table within the data dictionary table with the map, deletes the original table data from its original network location, and immediately releases the EXCLUSIVE lock.

According to an embodiment, at 350, the reconfiguration manager provides an ALTER TABLE MAP operation within an existing database administrative interface for activating the reconfiguration manager as a DML (such as SQL) command.

In an embodiment, at 360, the reconfiguration manager allows the table to be accessible and online within the database processing environment until the EXCLUSIVE lock (at 330) is obtained. The reconfiguration manager is back online and accessible when the EXCLUSIVE lock is released (at 340).

In an embodiment, at 370, the reconfiguration manager processes as a background process within the database processing environment.

In an embodiment of 370 and at 371, the reconfiguration manager is invoked in iterative processing (310-340) for processing a list of tables. That is, a background processing can initiate the reconfiguration manager in a loop process to reconfigure the table and a listing of other tables (each iteration of the loop making an unique invocation to the reconfiguration manager with a particular table identifier from the list of tables).

In an embodiment, at 380, the reconfiguration manager processes when an original assignment of the table to a processing unit of the database processing environment is being changed to a different processing unit within the database processing environment.

Figure 4:
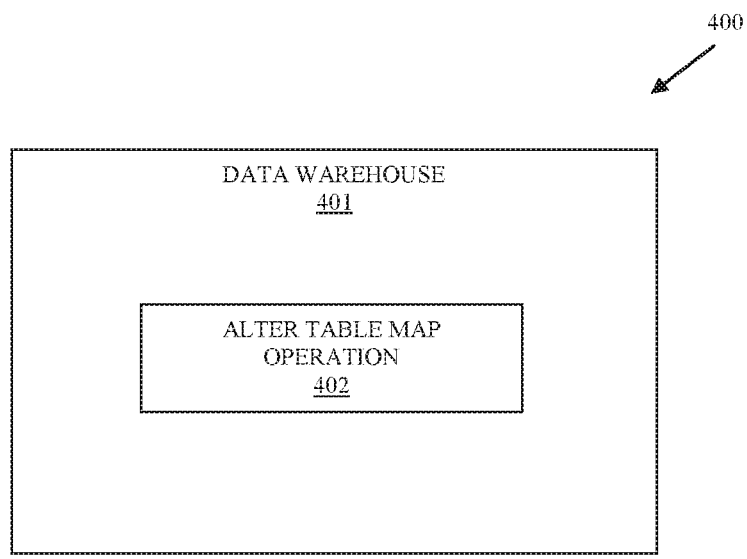
FIG. 4 is a diagram of another system for online and dynamic table reconfiguration, according to an example embodiment.

FIG. 4 is a diagram of another system 400 for online and dynamic table reconfiguration, according to an embodiment. The system 400 includes a variety of hardware components and software components. The software components are programmed as executable instructions into memory or a non-transitory computer-readable medium for execution on the hardware components.

The system 400 implements, inter alia, the processing discussed above with the FIGS. 1-3.

The system 400 includes a data warehouse 401. The data warehouse 401 includes alter table map operation 402.

The alter table map operation 402 is configured to: 1) execute on at least one hardware processor of a network computing device, 2) perform processing that permits a table of the data warehouse to be moved and a map associated with the table reconfigured in a data dictionary table while the table remains online and accessible for access within the data warehouse device.

In an embodiment, the alter table map operation 402 is further configured to: 3) perform processing that permits 2) to be rolled back to an original configuration of the data warehouse.

In an embodiment, the alter table map operation 402 is the ALTER TABLE MAP operation 112.

In an embodiment, the alter table map operation 402 is the method 200.

In an embodiment, the alter table map operation 402 is the method 300.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled

The invention claimed is:

1. A method, comprising:
   creating a map representing moving a table from a first network location to a second network location;
   obtaining a READ lock on the table;
   moving original table data for the table from the first network location into a temporary table at the second network location using the map;
   acquiring an EXCLUSIVE lock on the table; and
   updating a data dictionary with the map, deleting the original table data from the first network location, renaming the temporary table to be the table, and releasing the EXCLUSIVE lock.

2. The method of claim 1, wherein creating further includes providing hash values in the map that link the table to the second network location.

3. The method of claim 2, wherein providing further includes providing in the hash values a processing unit identifier for a processing unit that is to be assigned for processing the table at the second network location.

4. The method of claim 1, wherein obtaining further includes initiating the READ lock in response to a ALTER TABLE MAP operation issued from an administrative interface with a table identifier for the table and a map identifier for the map as parameters.

5. The method of claim 1, wherein updating further includes changing a pointer in the data dictionary that points to an existing map for the table to the map.

6. The method of claim 5, wherein changing further includes deleting the existing map.

7. The method of claim 1 further comprising, processing the method to rebalance table assignments to processing units within a distributed data warehouse.

8. The method of claim 7, wherein processing further includes processing the method when a particular one of the processing units are one of: being added to the distributed data warehouse and being removed from the distributed data warehouse.

9. The method of claim 1 further comprising, processing the method while the table remains online and accessible within a distributed data warehouse until the EXCLUSIVE lock is acquired and the table is back online when the EXCLUSIVE lock is released.

10. The method of claim 1 further comprising, providing an ALTER TABLE MAP operation within a data warehouse administrative interface that when issued from the data warehouse administrative interface activates the processing of the method.

11. The method of claim 10, wherein providing the ALTER TABLE MAP operation comprises providing the ALTER TABLE MAP operation as an extension to existing Structured Query Language (SOL) associated with the data warehouse administrative interface.

12. A method, comprising:
issuing a READ lock on a table;
moving original table data for the table to a temporary table according to a map that links to the temporary table within a data dictionary table;
obtaining an EXCLUSIVE lock for the table; and
replacing an existing map for the table within the data dictionary table with the map, deleting the original table data, renaming the temporary table to be the table, and releasing the EXCLUSIVE lock.

13. The method of claim 12 further comprising, providing an ALTER TABLE MAP operation within an existing database administrative interface for activating the processing of the method as a Data Manipulation Language (DML) command.

14. The method of claim 12 further comprising, allowing the table to be accessible and online within a database processing environment until the EXCLUSIVE lock is obtained with the table back online when the EXCLUSIVE lock is released.

15. The method of claim 12 further comprising, processing the method as a background process within a database processing environment.

16. The method of claim 13, wherein processing further includes iterating the processing of the method for a list of additional tables.

17. The method of claim 12 further comprising, processing the method when an original assignment of the table to a processing unit of a database processing environment is being changed to a different processing unit.

18. The method of claim 12, wherein moving further includes identifying a rollback command, deleting the temporary table and the map, and aborting the processing.

* * * * *